United States Patent
Pearson

(10) Patent No.: US 7,632,583 B2
(45) Date of Patent: Dec. 15, 2009

(54) APPARATUS FOR IMPROVING THE PERFORMANCE OF A FUEL CELL ELECTRIC POWER SYSTEM

(75) Inventor: Martin T. Pearson, Burnaby (CA)

(73) Assignee: Ballard Power Systems Inc., Burnaby, British Columbia (CA)

( * ) Notice: Subject to any disclaimer, the term of this patent is extended or adjusted under 35 U.S.C. 154(b) by 1212 days.

(21) Appl. No.: 10/430,903

(22) Filed: May 6, 2003

(65) Prior Publication Data

US 2004/0224192 A1    Nov. 11, 2004

(51) Int. Cl.
*H01M 8/04*    (2006.01)
(52) U.S. Cl. .......................... 429/22; 429/23
(58) Field of Classification Search ............ 429/22, 429/23, 34, 21, 12; 322/28, 37; 324/511, 324/522; 363/50, 74; 331/17
See application file for complete search history.

(56) References Cited

U.S. PATENT DOCUMENTS

| | | | | |
|---|---|---|---|---|
| 3,443,115 | A | * 5/1969 | Timmerman, Jr. | 307/66 |
| 3,823,358 | A | 7/1974 | Rey | 320/3 |
| 4,000,003 | A | 12/1976 | Baker et al. | 429/7 |
| 4,056,764 | A | 11/1977 | Endo et al. | 320/3 |
| 4,721,660 | A | 1/1988 | Kujas | 429/40 |
| 4,839,574 | A | 6/1989 | Takabayashi | 320/3 |
| 4,883,724 | A | 11/1989 | Yamamoto | 429/23 |
| 4,904,548 | A | 2/1990 | Tajima | 429/22 |
| 4,931,947 | A | 6/1990 | Werth et al. | 364/492 |
| 4,962,462 | A | 10/1990 | Fekete | 364/492 |
| 5,154,986 | A | 10/1992 | Takechi et al. | 429/23 |
| 5,318,142 | A | 6/1994 | Bates et al. | 180/65.2 |
| 5,334,463 | A | 8/1994 | Tajima et al. | 429/9 |
| 5,339,018 | A | 8/1994 | Brokaw | 320/35 |
| 5,465,011 | A | 11/1995 | Miller et al. | 307/64 |
| 5,482,790 | A | 1/1996 | Yamada et al. | 429/9 |
| 5,601,936 | A | 2/1997 | Dudfield et al. | 429/13 |
| 5,624,768 | A | 4/1997 | Tanokura | 429/23 |
| 5,714,874 | A | 2/1998 | Bonnefoy | 323/299 |
| 5,780,980 | A | 7/1998 | Naito | 318/139 |
| 5,916,699 | A | 6/1999 | Thomas et al. | 429/3 |
| 5,929,594 | A | 7/1999 | Nonobe et al. | 320/104 |
| 5,998,885 | A | 12/1999 | Tamor et al. | 307/10.1 |

(Continued)

FOREIGN PATENT DOCUMENTS

DE    1 080 680    4/1960

(Continued)

OTHER PUBLICATIONS

Bernay, C., et al., "Prospects of Different Fuel Cell Technologies for Vehicle Applications," *Journal of Power Sources 108*:139-152, 2002.

(Continued)

*Primary Examiner*—Raymond Alejandro
(74) *Attorney, Agent, or Firm*—Seed IP Law Group PLLC

(57) ABSTRACT

Current pulsing improves the performance of fuel cells in a fuel cell stack based power system. Voltage clamping limits the voltage peaks that occur after a current pulse. In a hybrid power system, an electric storage device supplies the loads during current pulsing. The electric storage device may sink current to achieve the voltage clamping, and/or power system may employ other the voltage clamping circuits.

15 Claims, 14 Drawing Sheets

U.S. PATENT DOCUMENTS

| | | | |
|---|---|---|---|
| 6,011,324 A | 1/2000 | Kohlstruck et al. .......... 307/64 |
| 6,030,718 A | 2/2000 | Fuglevand et al. ........... 429/26 |
| 6,096,448 A | 8/2000 | Wilkinson et al. ........... 429/13 |
| 6,096,449 A | 8/2000 | Fuglevand et al. ........... 429/13 |
| 6,100,665 A | 8/2000 | Alderman ................... 320/127 |
| 6,134,124 A | 10/2000 | Jungreis et al. .............. 363/34 |
| 6,158,537 A | 12/2000 | Nonobe .................... 180/65.3 |
| 6,184,593 B1 | 2/2001 | Jungreis ..................... 307/64 |
| 6,187,464 B1 | 2/2001 | Yasumoto et al. ............ 429/13 |
| 6,214,484 B1 | 4/2001 | Hauer .......................... 429/9 |
| 6,215,272 B1 | 4/2001 | Ohara et al. ................ 320/104 |
| 6,255,008 B1 | 7/2001 | Iwase ........................... 429/9 |
| 6,451,470 B1 | 9/2002 | Koschany et al. ............ 429/40 |
| 6,465,910 B2 | 10/2002 | Young et al. .................. 307/64 |
| 6,472,090 B1 | 10/2002 | Colbow et al. ............... 429/13 |
| 6,497,974 B2 | 12/2002 | Fuglevand ................... 429/22 |
| 6,555,989 B1 | 4/2003 | Pearson ..................... 320/101 |
| 6,573,682 B1 | 6/2003 | Pearson ..................... 320/101 |
| 6,677,066 B1 * | 1/2004 | Jansen et al. ................... 429/7 |
| 6,743,536 B2 | 6/2004 | Fuglevand .................... 429/9 |
| 6,757,590 B2 | 6/2004 | Ross et al. .................. 700/286 |
| 6,761,987 B2 | 7/2004 | Marvin et al. ................ 429/13 |
| 6,773,839 B2 | 8/2004 | Fuglevand et al. ........... 429/22 |
| 6,815,101 B2 | 11/2004 | de Vaal et al. ................ 429/13 |
| 6,835,481 B2 | 12/2004 | Dickman et al. ............. 429/19 |
| 6,838,923 B2 | 1/2005 | Pearson ..................... 327/309 |
| 6,841,275 B2 | 1/2005 | Pearson ....................... 429/9 |
| 6,847,515 B1 | 1/2005 | Kelley et al. ................ 361/160 |
| 6,861,167 B2 | 3/2005 | Wells et al. .................. 429/13 |
| 6,887,601 B2 | 5/2005 | Moulthrop, Jr. et al. ....... 429/17 |
| 6,887,606 B2 | 5/2005 | Parr et al. .................... 429/22 |
| 6,893,757 B2 | 5/2005 | Kato ........................... 429/23 |
| 6,896,990 B2 | 5/2005 | Mattejat et al. .............. 429/38 |
| 6,913,847 B2 | 7/2005 | Wells et al. .................. 429/26 |
| 6,953,630 B2 | 10/2005 | Wells .......................... 429/13 |
| 6,960,401 B2 | 11/2005 | Barton et al. ................. 429/13 |
| 6,979,504 B2 | 12/2005 | Manery ....................... 429/13 |
| 7,011,902 B2 | 3/2006 | Pearson ....................... 429/13 |
| 7,060,379 B2 | 6/2006 | Speranza et al. ............... 429/9 |
| 7,087,327 B2 * | 8/2006 | Pearson ....................... 429/12 |
| 7,132,185 B2 | 11/2006 | Wardrop et al. .............. 429/22 |
| 7,144,646 B2 | 12/2006 | Pearson ....................... 429/21 |
| 2001/0044040 A1 | 11/2001 | Uribe et al. ................... 429/13 |
| 2002/0036430 A1 | 3/2002 | Welches et al. ............... 307/18 |
| 2002/0177021 A1 * | 11/2002 | Fuglevand ................... 429/23 |
| 2003/0022036 A1 | 1/2003 | Parr ............................. 429/22 |
| 2003/0022050 A1 | 1/2003 | Barton et al. ................. 429/34 |
| 2004/0009380 A1 | 1/2004 | Pearson ....................... 429/23 |
| 2004/0185316 A1 | 9/2004 | Wells et al. .................. 429/22 |
| 2004/0224192 A1 | 11/2004 | Pearson ....................... 429/13 |
| 2004/0229095 A1 | 11/2004 | Pearson ....................... 429/23 |
| 2005/0249988 A1 | 11/2005 | Pearson ....................... 429/13 |
| 2005/0249989 A1 * | 11/2005 | Pearson ....................... 429/13 |
| 2006/0172162 A1 * | 8/2006 | Pearson ....................... 429/22 |

FOREIGN PATENT DOCUMENTS

| | | |
|---|---|---|
| DE | 1 301 861 | 8/1969 |
| DE | 198 10 468 A1 | 9/1999 |
| DE | 100 10 985 A1 | 9/2001 |
| EP | 0 136 187 A2 | 4/1985 |
| EP | 0 334 474 A2 | 9/1989 |
| EP | 0 961 334 A2 | 12/1999 |
| EP | 1 009 054 B1 | 6/2000 |
| GB | 1131171 | 10/1968 |
| GB | 2 281 642 A | 3/1995 |
| JP | 58 133789 | 8/1983 |
| JP | 59-134573 | 8/1984 |
| JP | 1-234024 | 9/1989 |
| JP | 5-47396 | 2/1993 |
| JP | 6-29029 | 2/1994 |
| JP | 6-314569 | 11/1994 |
| JP | 7-105965 | 4/1995 |
| JP | 8-050902 | 2/1996 |
| JP | 8-213032 | 8/1996 |
| JP | 11-191424 | 7/1999 |
| WO | WO 01/71885 | 9/2001 |
| WO | WO 01/73879 | 10/2001 |
| WO | WO 02/084670 | 10/2002 |
| WO | WO 02/095851 | 11/2002 |

OTHER PUBLICATIONS

Marr, C., et al., "Composition and Performance Modelling of Catalyst Layer in a Proton Exchange Membrane Fuel Cell," *Journal of Power Sources* 77:17-27, 1999.

Murthy, M., et al., "The Performance of a PEM Fuel Cell Exposed to Transient CO Concentrations," *Electrochemical and Solid State Letters*, Oct. 2001, retrieved Oct. 13, 2004, from http://www.gore.com/fuelcells/pdfs/1.pdf>, pp. 1-22.

U.S. Appl. No. 11/558,383, filed Nov. 9, 2006, Pearson.

U.S. Appl. No. 60/421,126, filed May 16, 2002, Pearson.

U.S. Appl. No. 60/436,759, filed Dec. 27, 2002, Pearson.

U.S. Appl. No. 60/569,218, filed May 7, 2004, Pearson.

Apollo 13 Review Board (Cortright Commission), "Report of Apollo 13 Review Board," NASA, pp. i-x and Appendix A, Jun. 15, 1970.

Boyer, C., et al., "Evaluation of Methods to Increase the Oxygen Partial Pressure in PEM Fuel Cells," *Journal of Applied Electrochemistry* 29:1095-1102, 1999.

EPRIsolutions, Inc., "Market Assessment of Ultracapacitors for Medium and High Power Applications," Palo Alto, CA, 2000, 1000810.

Ertl, H. et al., "A Novel Multi-Cell DC-AC Converter for Applications in Renewable Energy Systems," in *Proceedings of the 43$^{rd}$ Int'l Power Electronics Conference*, Jun. 2001.

Kato, N. et al., "A 1kW Portable Fuel Cell System Based on Polymer Electrolyte Fuel Cells," *NTT R and D* 48(12):877-881, 1991.

Key, T., "Fast Response, Load Matching Hybrid Fuel Cell," EPRI PEAC, Quarterly Review Meeting, Jul. 27, 2001.

Mai, W., "Dual Current-Limiting Switch for USB Applications," *Electronic Design*, pp. 124, 126, May 2000.

Maloney, T., "PEM-Battery: Design, Construction and Test," *Power Computing Solutions, Inc.*, NETL Publications 1999 Conference Proceedings.

Nickerson, J., "Ultracapacitors: Managing Power and Energy," Darnell Group, Inc. 2000.

Passive Component Industry, "Large-Can EDLC Capacitors: A Market in the Making," Jul./Aug. 2001, pp. 7-8, 10-11, 14.

Power Distribution Inc., "PDI Switcher Solutions: CBEMA Curve Reissued," Richmond, VA, 1998.

Rufer, A. et al., "A Supercapacitor-Based Energy Storage System for Elevators with Soft Commutated Interface," in *Proceedings of the Energy Storage Association, Spring Meeting 2001*, Chattanooga, TN, Mar. 2001.

Schneuwly, A. et al., "BOOSTCAP® Double-Layer Capacitors for Peak Power Automotive Applications," in *Proceedings of the Energy Storage Association, Spring Meeting 2001*, Chattanooga, TN, Mar. 2001.

Texas Instruments Incorporated, " 'Hot Plug-In' In-Rush Current Limiting Circuits for Power Trends' DC-DC Converters," Dallas, TX, 2000.

Warner, S., "Extending the Reliability of DC Power in a Telecommunications Network," in *Proceedings of the 15$^{th}$ Int'l. Telecommunications Energy Conference*, Paris, France, 1993, pp. 83-86.

* cited by examiner

APPARATUS FOR IMPROVING THE PERFORMANCE OF A FUEL CELL ELECTRIC POWER SYSTEM

BACKGROUND OF THE INVENTION

1. Field of the Invention

The present invention relates to fuel cell electric power systems, and particularly to methods and apparatus for improving the performance of fuel cell stacks in fuel cell electric power systems.

2. Description of the Related Art

Fuel cells electrochemically react a fuel stream comprising hydrogen and an oxidant stream comprising oxygen to generate an electric current. Fuel cell electric power systems employing stacks of fuel cells are used in a variety of transportation, portable and stationary power applications.

Performance losses have been observed in fuel cells employing catalysts comprising platinum (Pt.). For example, under constant current conditions the voltage of polymer electrolyte membrane fuel cells typically is initially as high as 0.9 V, but begins to fall fairly quickly. Similarly, under constant voltage conditions, particularly at higher voltages, the initial current drops from its original output value. This performance loss has been attributed to various sources, including carbon monoxide poisoning of the catalyst and loss of cathode catalyst activity due to adsorption of oxides from water.

Several approaches have been employed for reversing this performance degradation. For example, U.S. Pat. No. 5,601,936 discloses applying a reverse DC potential to the anode and cathode of a fuel cell. CA 2,284,589 discloses pulsing the anode potential by temporarily shorting the anode and cathode or by producing a positive voltage pulse with an external DC voltage source. Conversely, US 2001/0044040 A1 discloses switching the cathode to an output load to reduce the cell voltage at a pulse width effective to reverse performance degradation. U.S. Pat. No. 6,096,448 discloses fuel starving a fuel cell stack by connecting a transient load to the stack. Both U.S. Pat. No. 6,096,449 and U.S. Pat. No. 6,451,470 B1 disclose periodically shorting fuel cells.

U.S. Pat. No. 6,096,449 also discloses a shunt controller coupled to numerous shunt control circuits corresponding to each fuel cell in the system. The shunt controller also comprises a pair of voltage sensors, a bypass circuit coupling the anode and cathode together, and a current sensor associated with each fuel cell. The shunt controller further controls a fuel gas shut-off control valve for terminating supply of fuel gas to a fuel cell.

These approaches have one or more disadvantages. First, they may result in power fluctuations to the external load when the fuel cell stack is shorted or its current or voltage is pulsed. This is problematic in applications where the external load is intolerant of the magnitude and/or frequency of such power fluctuations. Alternatively, the external load may be disconnected from the fuel cell stack during pulsing, undesirably interrupting power supply to the load.

Second, the control systems involved in implementing such approaches tend to be overly complex. The complexity of the shunt controller in U.S. Pat. No. 6,096,449, for example, may undesirably increase the cost and decrease operational reliability of the overall system.

It is desirable to have a method and apparatus for operating a fuel cell electric power system that not only increases the performance of the fuel cell stack, but is also relatively inexpensive, reliable and electrically efficient. The present invention addresses the disadvantages of conventional fuel cell power systems and provides further related advantages.

BRIEF SUMMARY OF THE INVENTION

In one aspect, a method of operating a power system comprising a stack of fuel cells, the method comprises: from time-to-time, current pulsing the stack of fuel cells; and clamping a fuel cell voltage below a maximum fuel cell voltage level during at least a period after current pulsing the stack of fuel cells. Current pulsing the stack of fuel cells may comprise: providing a short circuit path across the stack of fuel cells; and removing the short circuit path across the stack of fuel cells. Current pulsing the stack of fuel cells may comprise: electrically coupling a load across the stack of fuel cells; and electrically uncoupling the load from across the stack of fuel cells.

In another aspect, a method of operating a power system to power at least one load, the power system comprising a fuel cell stack and at least one electrical storage device electrically coupled in parallel with the fuel cell stack, the method comprises: temporarily shorting the fuel cell stack from time-to-time; and supplying power from the electrical storage device to the load at least while shorting the fuel cell stack.

In yet another aspect, a method of operating a power system comprising a stack of fuel cells and an electrical storage device electrically couplable to supply power to a load, the method comprises: from time-to-time, operating at least one switch to provide an electrical short circuit across the stack of fuel cells; operating the at least one switch to remove the electrical short circuit across the stack of fuel cells; supplying power from the electrical storage device to the load at least while shorting the fuel cell stack; and clamping a fuel cell voltage below a maximum fuel cell voltage level during at least a period after removing the short circuit path across the stack of fuel cells.

In still another aspect, a method of operating a power system having a fuel cell stack and an energy storage device electrically coupled to the fuel cell stack, to power a load and a balance of system, the method comprises: measuring a stack current being supplied by the fuel cell stack to the load and the balance of system; determining an amount of energy required by the load and the balance of system during a short circuit of the fuel cell stack; determining an amount of energy to be clipped off after the short circuit; determining an amount of energy to be pre-removed from the energy storage device based on the determined amount of energy required by the load and the balance of system during the short circuit and based on the determined amount of energy to be clipped off after the short circuit; determining a time required to pre-remove the determined amount of energy from the electrical storage device at a present load; disconnecting the load and the balance of system from the fuel cell stack; the determined time required to pre-remove energy from the electrical storage device after disconnecting the load and the balance of system, shorting the fuel cell stack; reconnecting the load and the balance of system to the fuel cell stack; and stopping the shorting of the fuel cell stack after shorting the fuel cell stack for a shorting duration.

In a further aspect, a power system for providing power to at least one load, comprises: a fuel cell stack; means for shorting the fuel cell stack from time-to-time; and means for clamping a fuel cell stack voltage below of maximum fuel cell stack voltage level at least during a period immediately following the shorting of the fuel cell stack.

In yet a further aspect, a power system comprises: a power bus; a fuel cell stack electrically coupled across the power bus; a pulsing switch electrically coupled across the fuel cell stack and operable to current pulse the fuel cell stack; a controller coupled to selectively control the pulsing switch to current pulse the fuel cell stack from time-to-time; and stack voltage clamping means for clamping a stack voltage at least during a period following the current pulsing of the fuel cell stack.

In yet still a further aspect, a power system for providing power to at least one load, the power system comprises: a fuel cell stack; shorting switch electrically coupled and operable to electrically short the fuel cell stack; an electrical storage device electrically coupled in parallel with the fuel cell stack; a diode electrically coupled between the fuel cell stack and the electrical storage device to protect the electrical storage device from electrical shorts; and a controller coupled to selectively control the shorting switch to short the fuel cell stack from time-to-time.

BRIEF DESCRIPTION OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Current pulsing involves shorting or connecting a load across a fuel cell or fuel cell stack in order to drop the voltage of the fuel cell(s) sufficiently to restore catalyst activity.

As discussed, performance losses have been observed in fuel cells employing catalysts comprising Pt, presumably due to loss of cathode catalyst activity over time. Immediately after current pulsing the fuel cell stack, the voltage of the fuel cell stack increases substantially. In typical PEM fuel cells, for example, the cell voltage will jump to about 0.76 V at full rated current immediately after a short is released. Cell voltage then decays over time back to some equilibrium value. Without being bound by theory, it is believed that this effect is due to stripping of oxygen species (and possibly other adsorbed species) from the cathode catalyst during pulsing, which restores catalyst activity; subsequent re-oxidation of the catalyst over time reduces its activity again.

Figure 1:
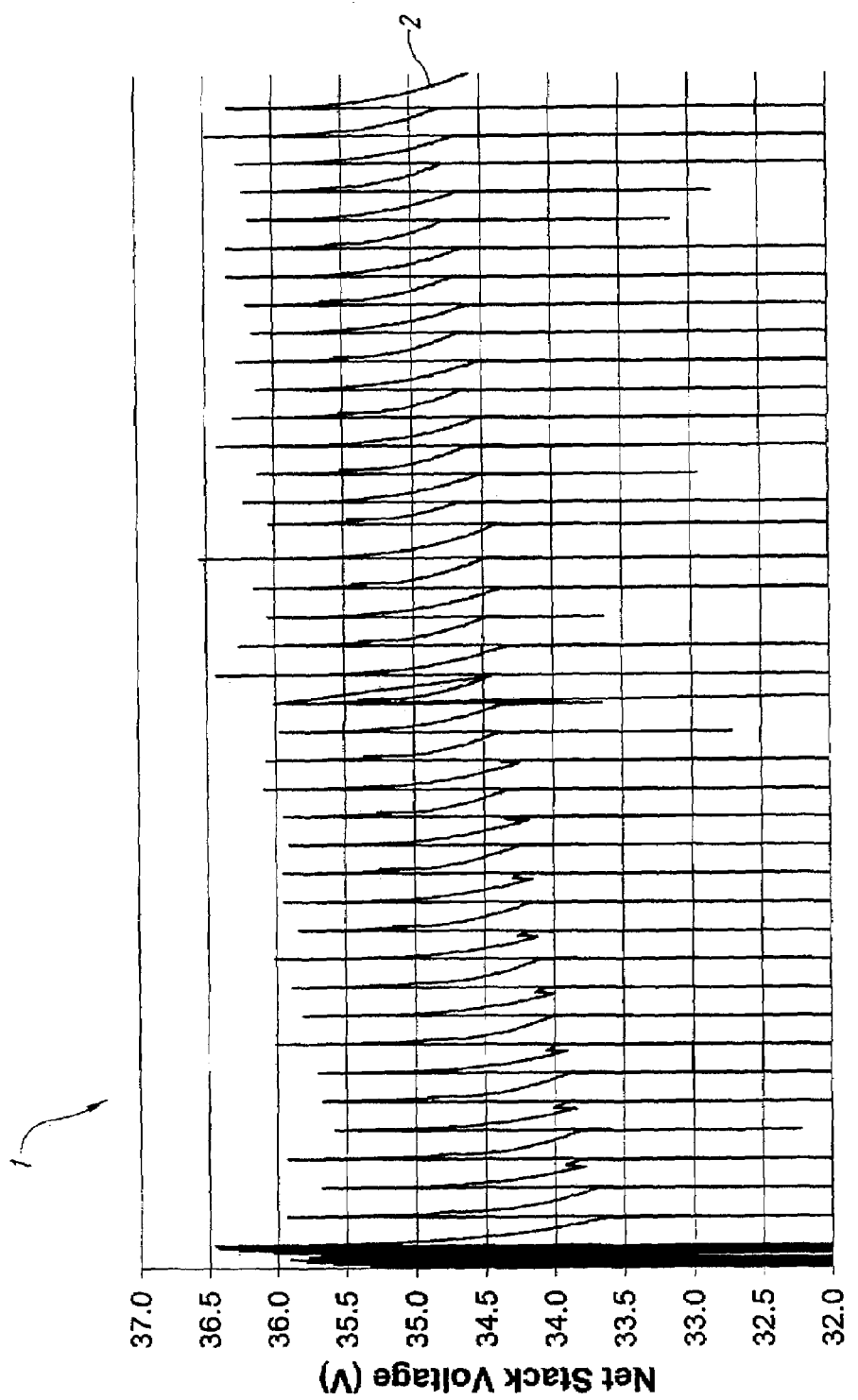
FIG. 1 is a graph of net stack voltage versus time for a NEXA™ fuel cell stack.

FIG. 1 shows a graph 1 of net stack voltage 2 of a NEXA™ fuel cell stack over time demonstrating this above described effect. The operating conditions were as follows: the reactants were hydrogen and humidified air, supplied at a pressure of 5 psig (35 kPa); reactant inlet temperature of 65° C.; 15 A output current; and, a 500 ms short was applied every minute.

Each vertical line in FIG. 1 corresponds to an electrical shorting of the fuel cell stack; the voltage 2 slowly decays over time until the next short.

Figure 2:
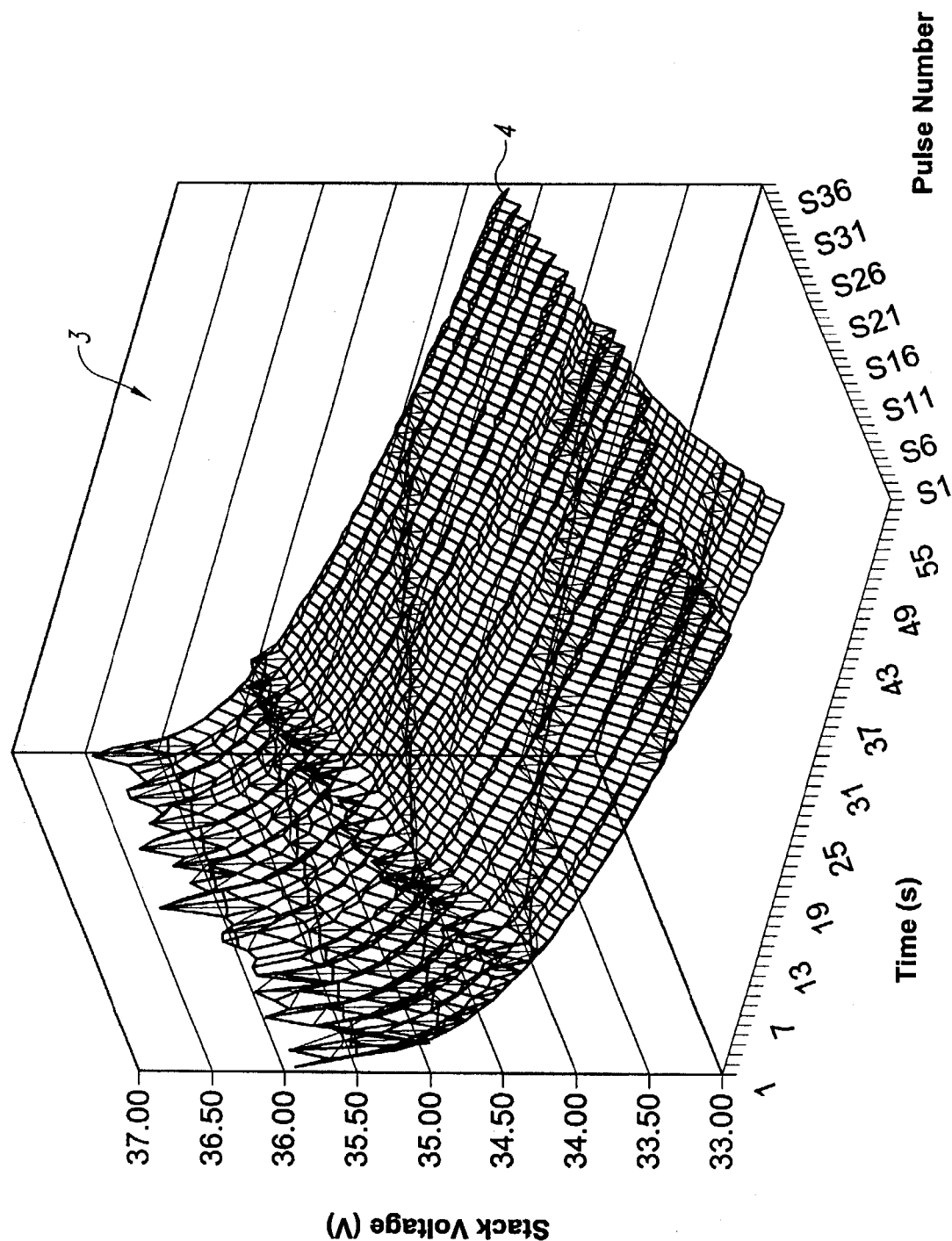
FIG. 2 is a three dimensional graph of a voltage decay curve for each pulse shown in the graph of FIG. 1.

The applicant has determined that, at least in some applications, shorting the stack can cause the fuel cell voltage to rise to an unacceptable level. FIG. 2 shows a 3-D graph 3 of the voltage decay curve 4 for each pulse shown in FIG. 1. Note the region of unstable voltage in the roughly 7-8 seconds following each short of the fuel cell stack.

Again, without being bound by theory, the applicant believes that the voltages on the fuel cells immediately following the short are high enough that corrosion of the cathode catalyst carbon support (and possibly of other carbon materials on the cathode side of the fuel cell) may occur.

Figure 3:
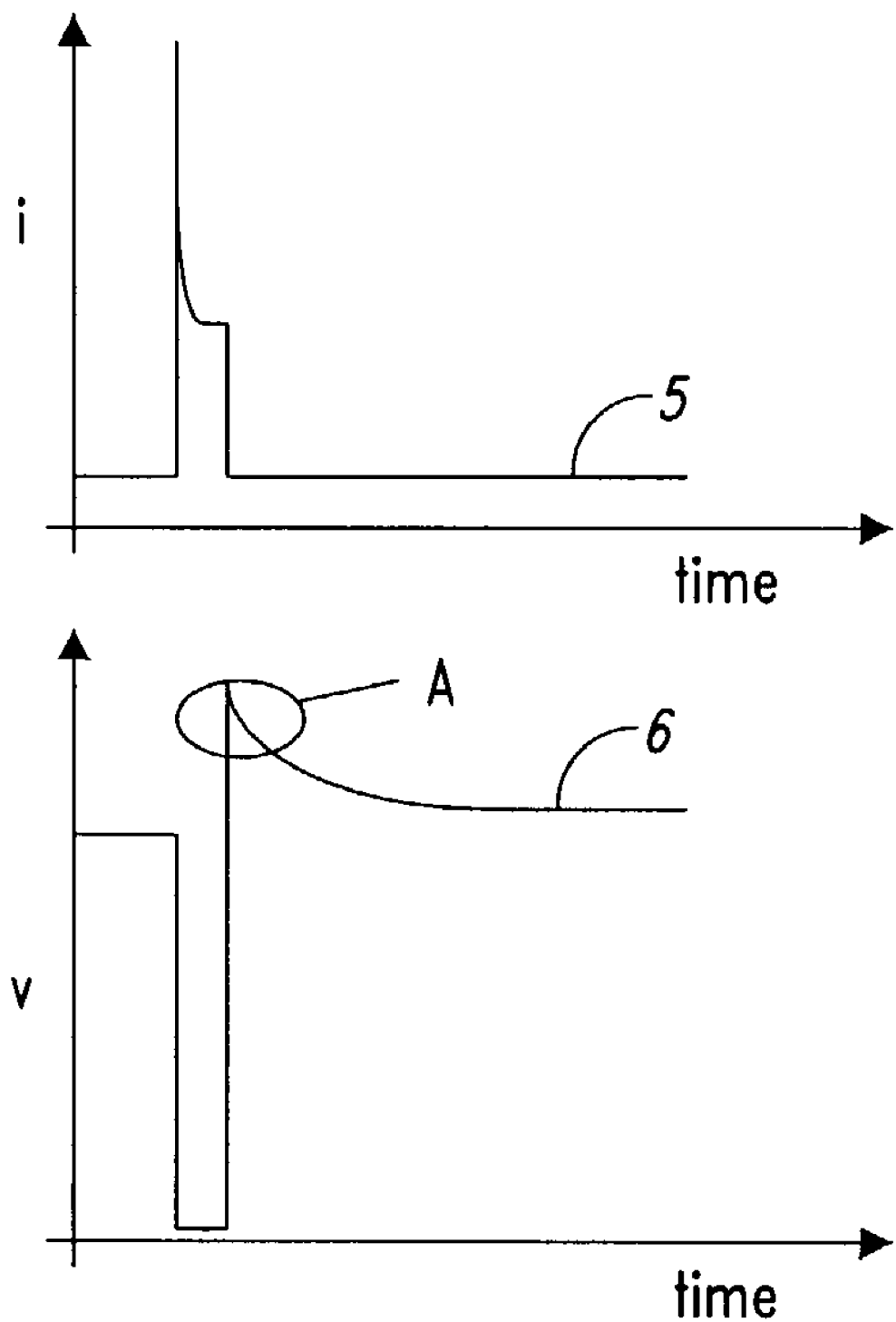
FIG. 3 are graphs of stack current and stack voltage versus time, illustrating current pulsing of a fuel cell.

FIG. 3 shows a graphical illustration of generalized current and voltage curves 5, 6, respectively, for a representative fuel cell that has been shorted for a brief time. Immediately after the short is released, the voltage of the fuel cell reaches a peak A and begins to fall off before reaching an equilibrium level. In region A, carbon corrosion can occur that may damage the cathode catalyst support and/or other cathode structures. Repeated exposure to such high voltages at higher current densities may result in significant carbon corrosion, which is reflected in the voltage instability observed in FIG. 2.

Figure 4:
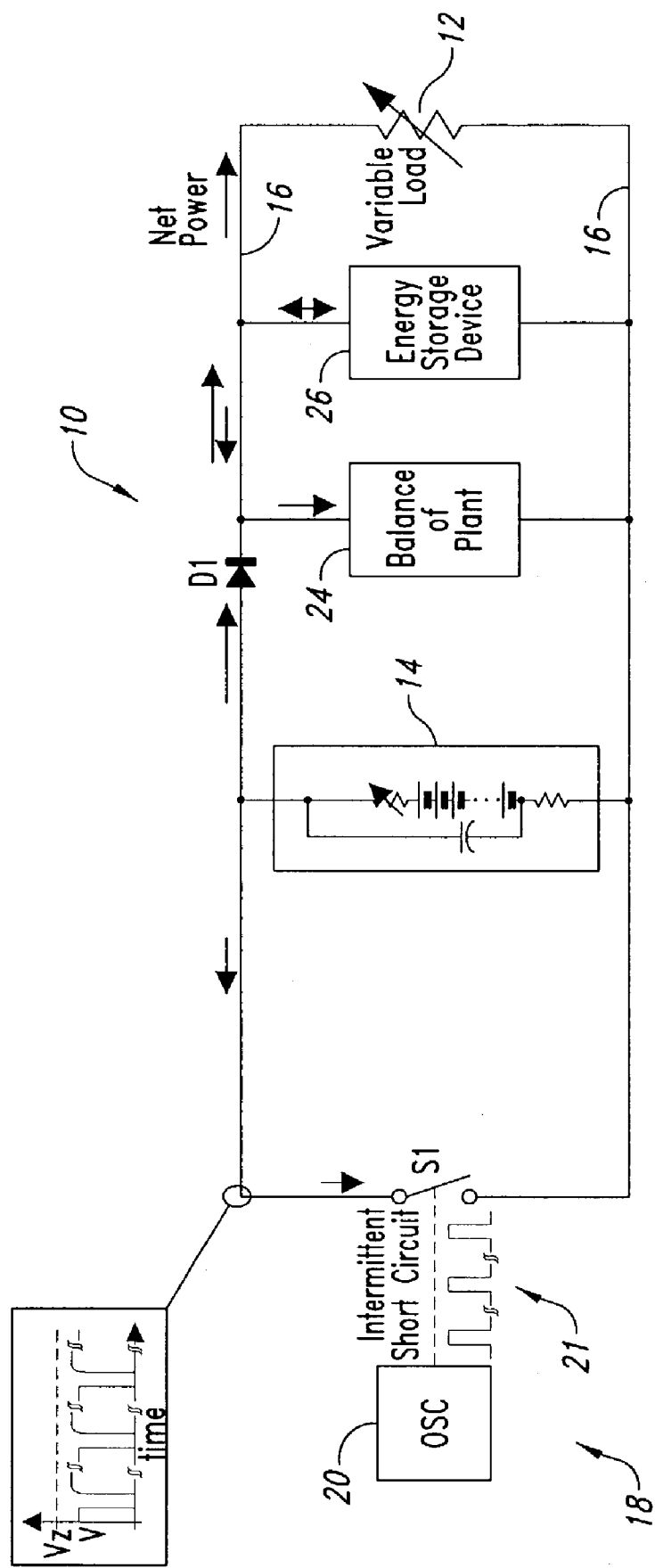
FIG. 4 is a schematic diagram of a power system to supply power to an external load and/or internal load according to one illustrated embodiment, the power supply system comprising a fuel cell stack, energy storage device and pulsing switch, where the pulsing switch is selectively operable to place an electrical short circuit across a fuel cell stack to current pulse the fuel cells.

FIG. 4 shows a power system 10 according to one illustrated embodiment, providing power to an external load 12. Details of the power system 10 not directly relevant to the present discussion, such as reactant supply systems and cooling systems, are not shown.

The power system 10 comprises a fuel cell stack 14 electrically coupled between rails of a power bus 16, a pulsing switch S1 electrically coupled across the fuel cell stack, and a controller 18 coupled to control the pulsing switch S1. The controller 18 may take the form of an oscillator 20, providing a simple, inexpensive and reliable circuit for current pulsing.

Figure 5:
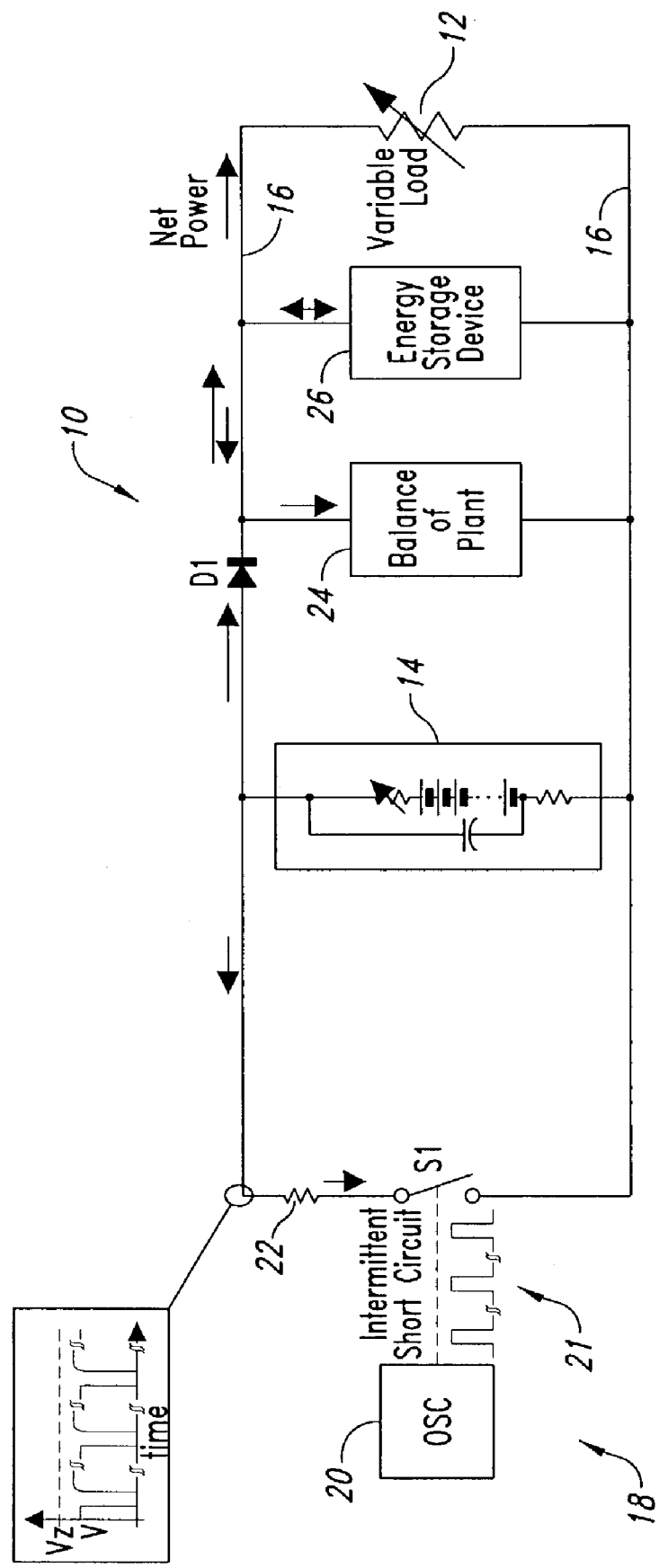
FIG. 5 is a schematic diagram of a power system to supply power to an external load and/or internal load according to another illustrated embodiment where the pulsing switch is selectively operable to place a load across a fuel cell stack to current pulse the fuel cells.

In the embodiment illustrated in FIG. 4, the pulsing switch S1 is operable to selectively short the fuel cell stack 14, for example, in response to pulsed signals 21 generated by the oscillator 20. In other embodiments, the pulsing switch S1 is operable to selectively place a pulsing load 22 (FIG. 5) across the fuel cell stack 14. In such embodiments, the pulsing load 22 placed across the fuel cell stack 14 should be small to ensure a sufficiently fast removal of charge from the anodes of the fuel cells. Shorting the fuel cell stack 14 is preferred over placing the pulsing load 22 across the fuel cell stack 14, to achieve the fastest possible recovery of the fuel cell stack 14.

The power system 10 may include one or more internal loads 24, which represent the various active components, for example, processors, sensors, indicators, valves, heaters, compressors, fans, and/or actuators such as solenoids. With respect to fuel cell systems, these internal loads 24 are typically referred to as the "balance of plant." The internal load 24 is electrically coupled to the power bus 16 in parallel with the fuel cell stack 14 to receive power therefrom.

As illustrated in FIG. 4, in some embodiments the power system 10 may further comprise an electrical storage device 26 electrically coupled in parallel with the fuel cell stack 14 to form of a hybrid power system 10. In such embodiments, the electrical storage device 26 provides current to the load(s) 12, 24 during the time when the stack current is pulsed. In such embodiments, the power system 10 may employ a diode D1 to protect the electrical storage device 26 from transients, such as those resulting from the short circuiting of the fuel cell stack 14.

Figure 6:
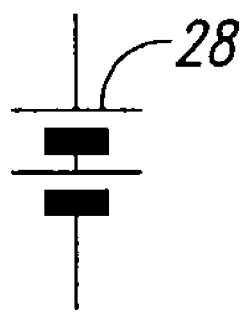
FIG. 6 is an electrical schematic diagram of a battery such as a VRLA battery, suitable for use as an electrical storage device in the power system.
Figure 7:
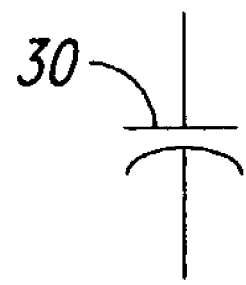
FIG. 7 is an electrical schematic diagram of a super-capacitor, suitable for use as an electrical storage device in the power system.

The electrical storage device 26 may take a variety of forms suitable for storing and releasing stored energy, for example, one or more batteries such as one or more valve regulated lead acid ("VRLA") batteries 28 (FIG. 6), and/or one or more super-capacitors 30 (FIG. 7). In embodiments where the electrical storage device 26 is a VRLA battery 28, for example, voltage variation to the loads 12, 24 may occur during stack current pulsing. In embodiments where the electrical storage device 26 is a super-capacitor band 30, such voltage variations may be easily filtered out.

Where the power system 10 includes an electrical storage device 26, the fuel cell stack 14 begins providing charging current to the electrical storage device 26 after the current pulse. Thus, the electrical storage device 26 may sink excess current generated by the fuel cell stack 14 after each current pulse to clamp the voltage of the fuel cell stack 14 below a maximum stack voltage limit $V_z$. For example, if the power system 10 has an equilibrium stack voltage that is less than a "float" voltage of the electrical storage device 26, the electrical storage device 26 continues to sink a portion of the current from the fuel cell stack 14 for as long as the stack voltage exceeds the "float" voltage of the electrical storage device 26.

The diode D1 may be selected so that the fuel cell stack 14 provides current to the loads 12, 24 only when the stack voltage is at or above a preset voltage limit. For example, where the electrical storage device 26 is a VRLA battery 28 the preset voltage limit may be the float voltage of the battery, about 27.4 V. When the stack voltage falls below the diode voltage limit, the energy storage device 26 supplies power to the load 12, 24 and the oscillator 20 implements a short circuit of the fuel cell stack 14 by closing pulsing switch S1. Opening pulsing switch S1 releases the short and the fuel cell stack 14 resumes supplying power to the loads 12, 24 and supplies current to recharge the electrical storage device 26. At high loads, this arrangement maintains the stack voltage below the maximum stack voltage limit $V_z$.

Figure 8:
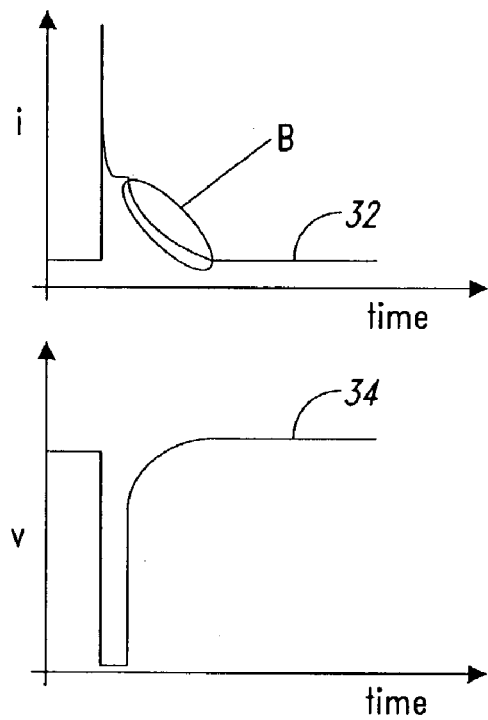
FIG. 8 are graphs of stack current and stack voltage versus time, illustrating where the electrical storage device sinks current to clamp the voltage of the fuel cell stack after current pulsing.

The use of an electrical storage device 26 to clamp voltage is one approach to addressing the undesirable voltage spike identified in FIGS. 2 and 3. FIG. 8 shows a graphical illustration of generalized current and voltage curves, 32, 34, respectively, for a fuel cell stack 14 in a representative hybrid power system (e.g., including fuel cell stack 14 and battery 28) that has been shorted for a brief time. The amount of current in region B of FIG. 8 includes the load current and battery charging current supplied by the fuel cell stack 14. The additional charging current supplied by the fuel cell stack 14 is sufficient to clamp the stack voltage at a determined maximum stack voltage limit $V_z$.

The timing or frequency of the current pulsing may be set or varied. For example, the current pulsing may be set to a defined periodic interval $T_H$, for example, occurring once a minute during operation. Alternatively, the controller 18 can short the fuel cell stack 14 whenever the stack voltage falls below a preset voltage limit, such as the "float" voltage of the electrical storage device 26. The preset voltage limit may be chosen by employing a number of fuel cells in the fuel cell stack 14 that is equal to the number of fuel cells necessary to produce the desired "float" voltage. For example, if a minimum operating fuel cell voltage of at least 0.67 V is desired, and the float voltage of the electrical storage device 26 is 27.4 V, then the fuel cell stack 14 would require at least 41 cells. Thus, the power system 10 may employ the frequency of the current pulsing to control the rate of charge transfer to the battery 28 or super-capacitor 30. When employing such an approach, the current pulsing frequency at a given load can be used to determine the amount of pollutants in the air being supplied to the stack; the higher the frequency of pulsing, the greater the concentration of pollutants, thus providing an additional advantage.

A duration $T_P$ of the current pulse may also be set or varied. For example, the duration of each current pulse may be predefined. For example, a pulse duration of approximately 500 milliseconds has been found to be particularly suitable with a current pulse frequency of once a minute. Alternatively, the duration may be adjusted based on a number of operating parameters and/or conditions of the power system 10, load 12 and/or fuel cell stack 14.

The above described method and apparatus can produce very high performance efficiencies from the fuel cells. For example, in a power system 10 employing a NEXA™ fuel cell stack 14 and VRLA battery 28, by current pulsing the fuel cell stack 14 when the stack voltage falls below the 27.4 V battery float voltage, the fuel cells may operate at an average voltage of about 0.69 V. This corresponds to a 57% efficiency, with the control system generating very low parasitic cooling loss and no power conversion losses at any load current. Furthermore, because the electrical storage device 26 supplies current when the fuel cell current is pulsed, there is no interruption of current to the external load 12 or internal load 24.

Figure 9:
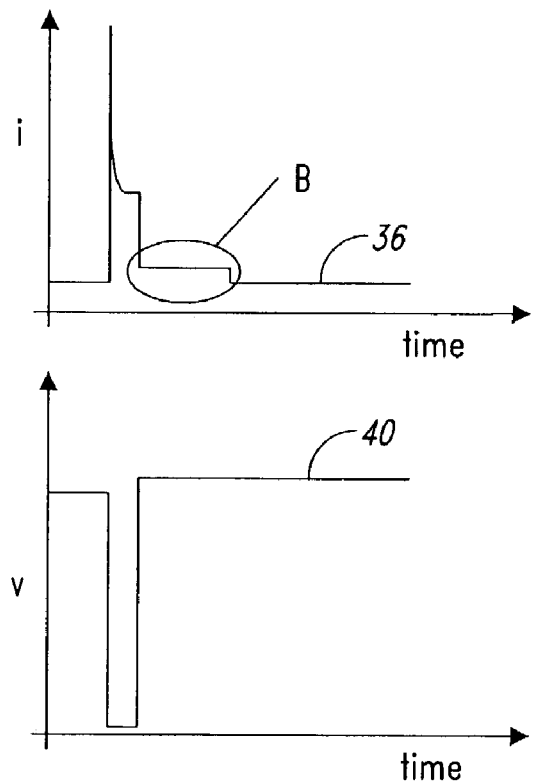
FIG. 9 are graphs of stack current and stack voltage versus time, where a clamping circuit clamps draws sufficient current from the fuel cell stack after current pulsing to clamp the voltage at a desired maximum stack voltage.
Figure 10:
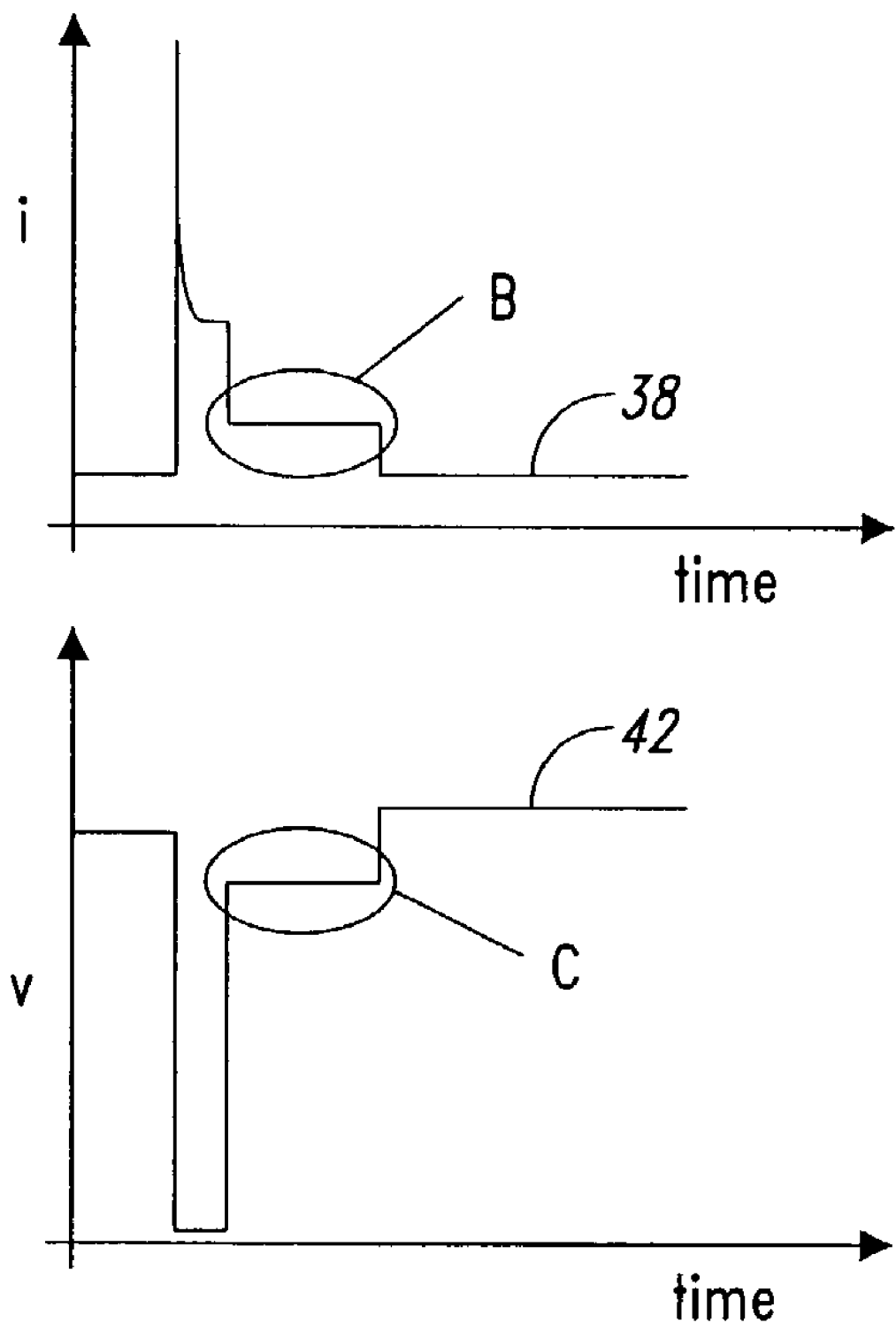
FIG. 10 are graphs of stack current and stack voltage versus time, where a clamping circuit clamps draws more than enough current from the fuel cell stack after current pulsing to clamp the voltage below a desired maximum stack voltage.

In other embodiments, the current drawn from the fuel cell stack 14 is increased for a short time immediately following the current pulse. FIGS. 9 and 10 are graphical illustrations of generalized current curves 36 38, respectively, and voltage curves 40, 42, respectively, for a representative fuel cell that has been shorted for a brief time according to these embodiments. In FIG. 9, the current 36 drawn from the fuel cell stack 14 after the current pulse is increased, as indicated in region B. The corresponding voltage curve 40 is flattened, avoiding the possible carbon corrosion associated with the voltage spike indicated by region A in FIG. 3. In FIG. 9 the current increase is just sufficient to clamp the fuel cell stack voltage at a desired maximum stack voltage limit $V_z$.

In practice, it may be difficult to control the current increase after pulsing in order to clamp the stack voltage with this degree of accuracy. In other embodiments, the magnitude of current increase after pulsing is at least occasionally greater than required to clamp the stack voltage at a desired maximum stack voltage limit $V_z$. This situation is illustrated in FIG. 10, where the current 38 drawn from the cell in region B is greater than in FIG. 9, with the result that the stack voltage 42 in region C is correspondingly lower. The additional heat generated in the fuel cell stack 14 by the larger current increase after pulsing is more than offset by preventing carbon corrosion at the cathode.

The current required to recharge the electrical storage device 26 after pulsing the stack current depends on the size of the load 12, 24 that is carried by electrical storage device 26 and the duration of the current pulse. In some applications, partial or low load conditions may be experienced. At low loads it is possible that the recharge current will not be high enough to clamp the fuel cell voltage after current pulsing. In certain embodiments, therefore, current pulsing may be discontinued under low load conditions. This approach is particularly suited for applications where is anticipated that the power system will not be under low load conditions often or for significant periods.

Figure 11:
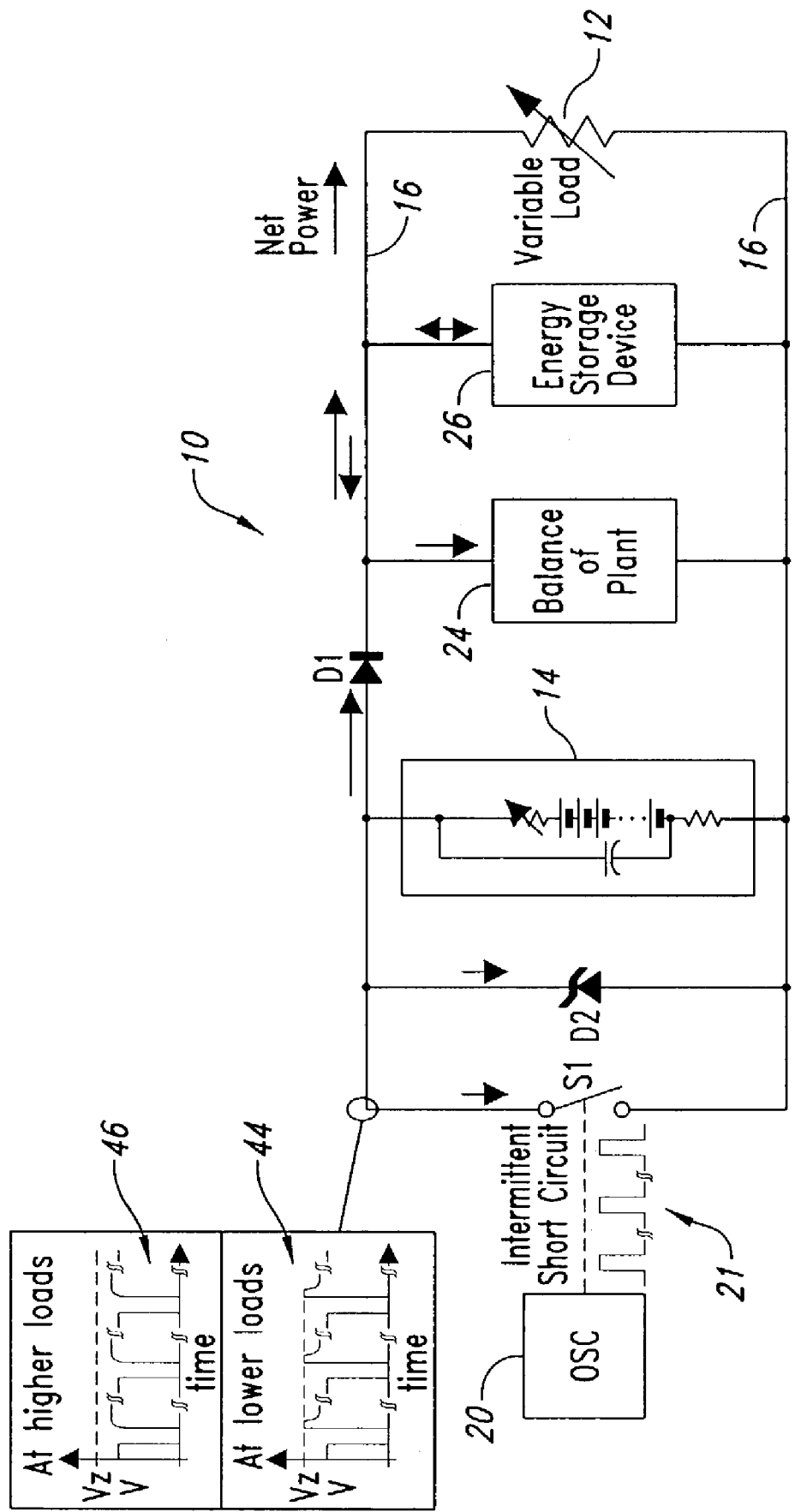
FIG. 11 is a schematic diagram of a power system according to another illustrated embodiment employing a zener diode to clamp the voltage of the fuel cell stack.
Figure 12:
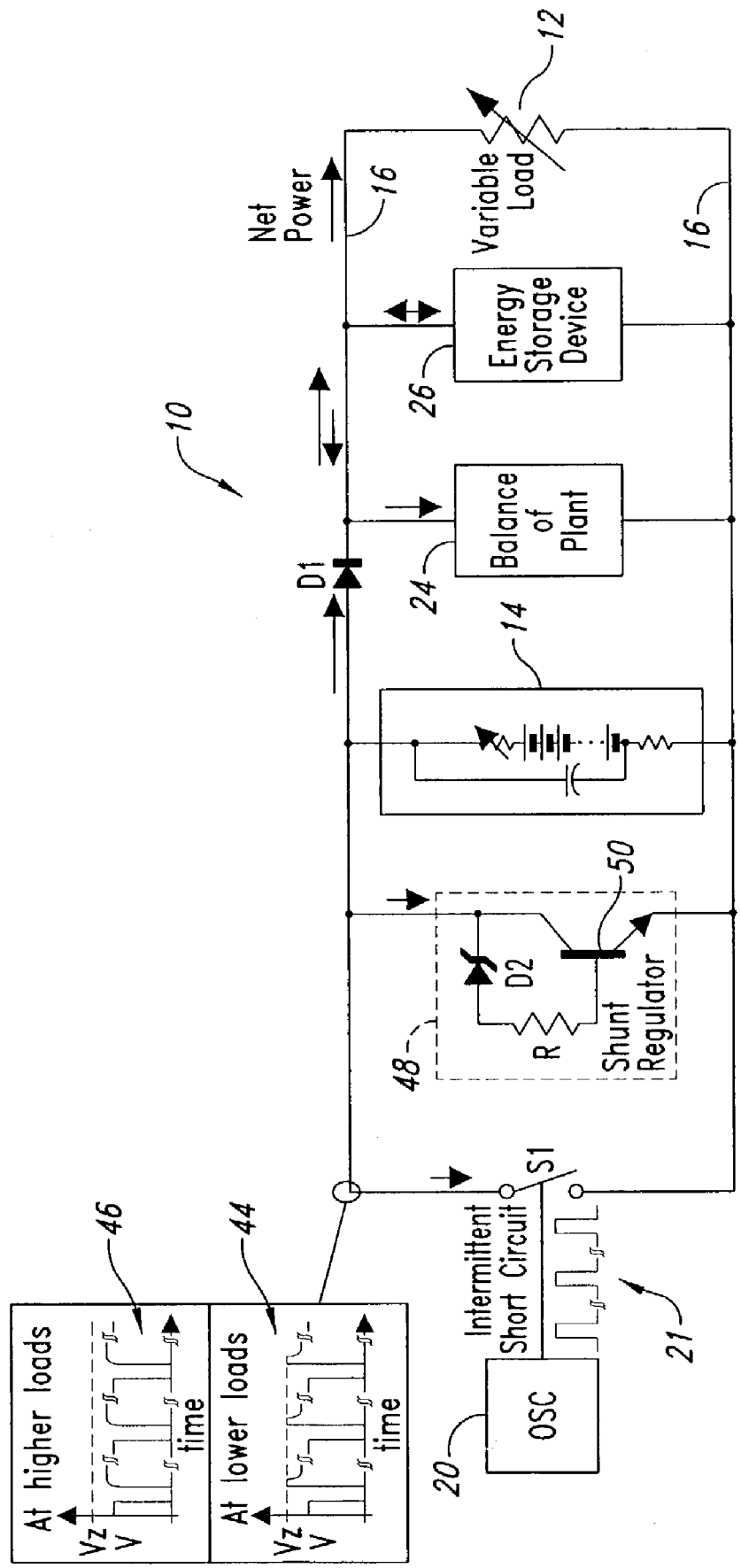
FIG. 12 is a schematic diagram of a power system according to another illustrated embodiment employing a shunt regulator to clamp the voltage of the fuel cell stack.
Figure 13:
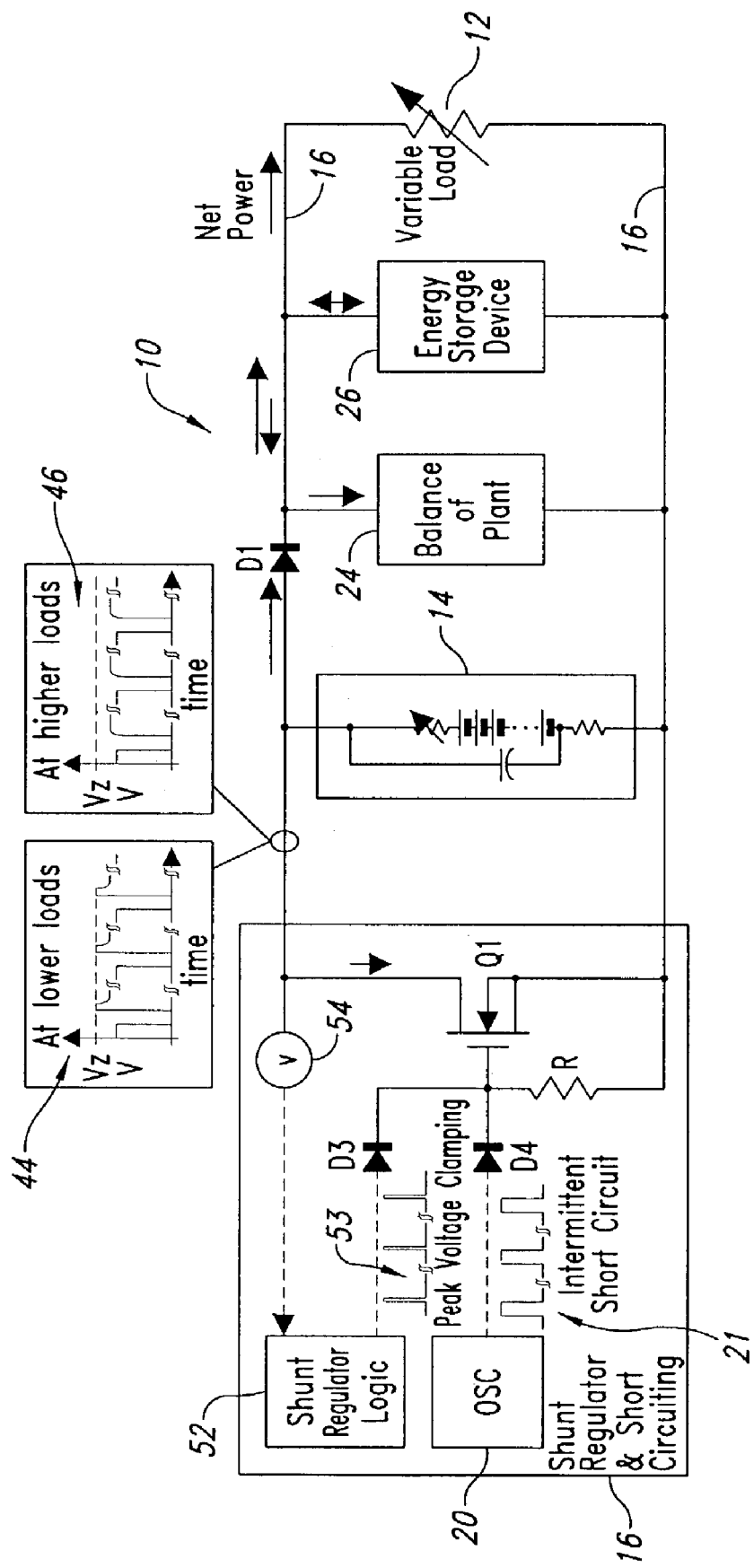
FIG. 13 is a schematic diagram of a power system according to another illustrated embodiment employing a controller comprising an oscillator and shunt regulator logic to clamp the voltage of the fuel cell stack.

FIGS. 11-13 illustrate other embodiments of the power system 10, which include additional circuitry to clamp the stack voltage in response to current pulsing, particularly suitable under partial or low load conditions. These other embodiments, and those other embodiments and other alternatives described herein, are substantially similar to previously described embodiments, and thus common acts and structures are identified by the same reference numbers. Only significant differences in operation and structure are described below. Further, as discussed above, the various embodiments of the power systems may rely on the fuel cell stack 14 as the sole source of power; hence, the electrical storage devices 26 in FIGS. 11-13 are optional.

FIG. 11 shows a zener diode D2 electrically coupled across the power bus 16 in parallel with the fuel cell stack 14. The breakdown voltage of the zener diode D2 is selected such that the zener diode D2 clamps the stack voltage below the desired maximum stack voltage limit $V_z$ when operating under low load conditions, as illustrated by the accompanying voltage curve 44, and as compared to operation under high load conditions as illustrated by accompanying voltage curve 46.

FIG. 12 shows a shunt regulator 48 electrically coupled across the power bus 16 in parallel with the fuel cell stack 14. The shunt regulator 48 is formed by a zener diode D2, gate resistor R and a transistor 50. The zener diode D2 and gate resistor R are electrically coupled to a gate of the transistor 50, to selectively activate the transistor 50 to clamp the stack voltage below the desired maximum stack voltage limit $V_z$ when operating under low load conditions, as illustrated by the accompanying voltage curve 44, and as compared to operation under high load conditions as illustrated by accompanying voltage curve 46.

FIG. 13 shows the controller 18, including the oscillator 20 and shunt regulator logic 52. The shunt regulator logic 52 may be implemented in software, firmware and/or hardware, and is executed by the controller 18. The controller 18 receives signals representative of a voltage sensed by a voltage sensor 54. The controller 18 provides control signals 21, 53 to operate a switch, such as a field effect transistor Q1, via diodes D3, D4 and a resistor R to clamp the stack voltage below the desired maximum stack voltage limit $V_z$ when operating under low load conditions, as illustrated by accompanying the voltage curve 44, and as compared to operation under high load conditions as illustrated by accompanying voltage curve 46.

In further embodiments, the electrical storage device 26 carries the load 12, 24 for a time before the stack current is pulsed and the fuel cell stack 14 provides recharge current afterwards. The time the electrical storage device 26 carries the load 12, 24 may be selected to compensate for the low load conditions, so that the recharge current is increased sufficiently to clamp the stack voltage at a predetermined maximum stack voltage limit $V_z$.

Figure 14:
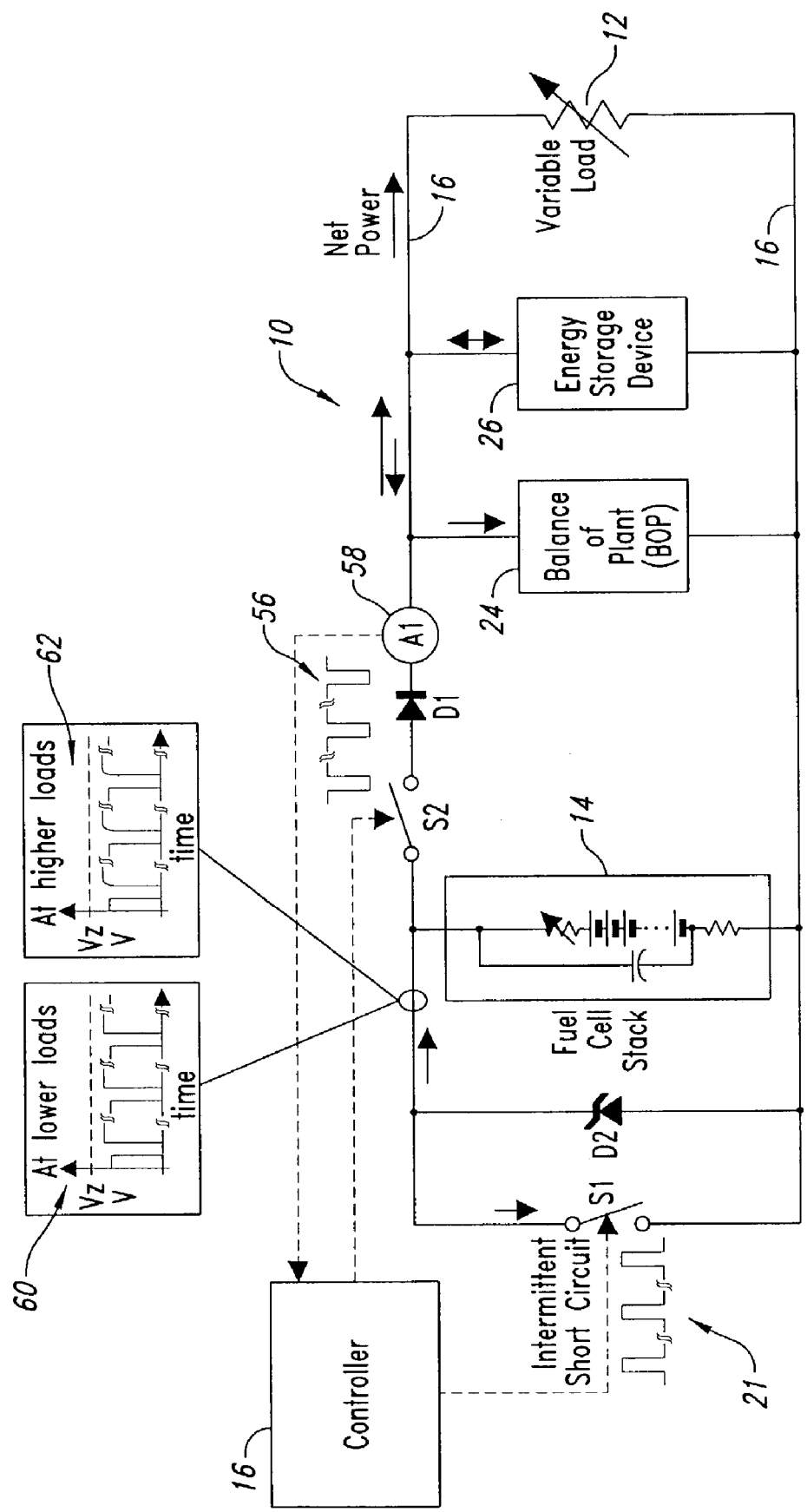
FIG. 14 is a schematic diagram of a power system according to another illustrated embodiment employing a zener diode and an isolation switch operable to selectively isolated the loads from the fuel cell stack, to remove energy from the energy storage device in preparation for voltage clamping after current pulsing.

FIG. 14 shows another embodiment of the power system 10, comprising a fuel cell stack isolation switch S2 operable to electrically couple and uncouple the loads 12, 24 from the fuel cell stack 14. The controller 18 receives signals 56 representing the stack current from a stack current sensor 58, and operates the fuel cell stack isolation switch S2 as discussed immediately below, to clamp the stack voltage below the desired maximum stack voltage limit VZ when operating under low load conditions, as illustrated by accompanying voltage curve 60, and when operating under high load conditions as illustrated by accompanying voltage curve 62.

Figure 15:
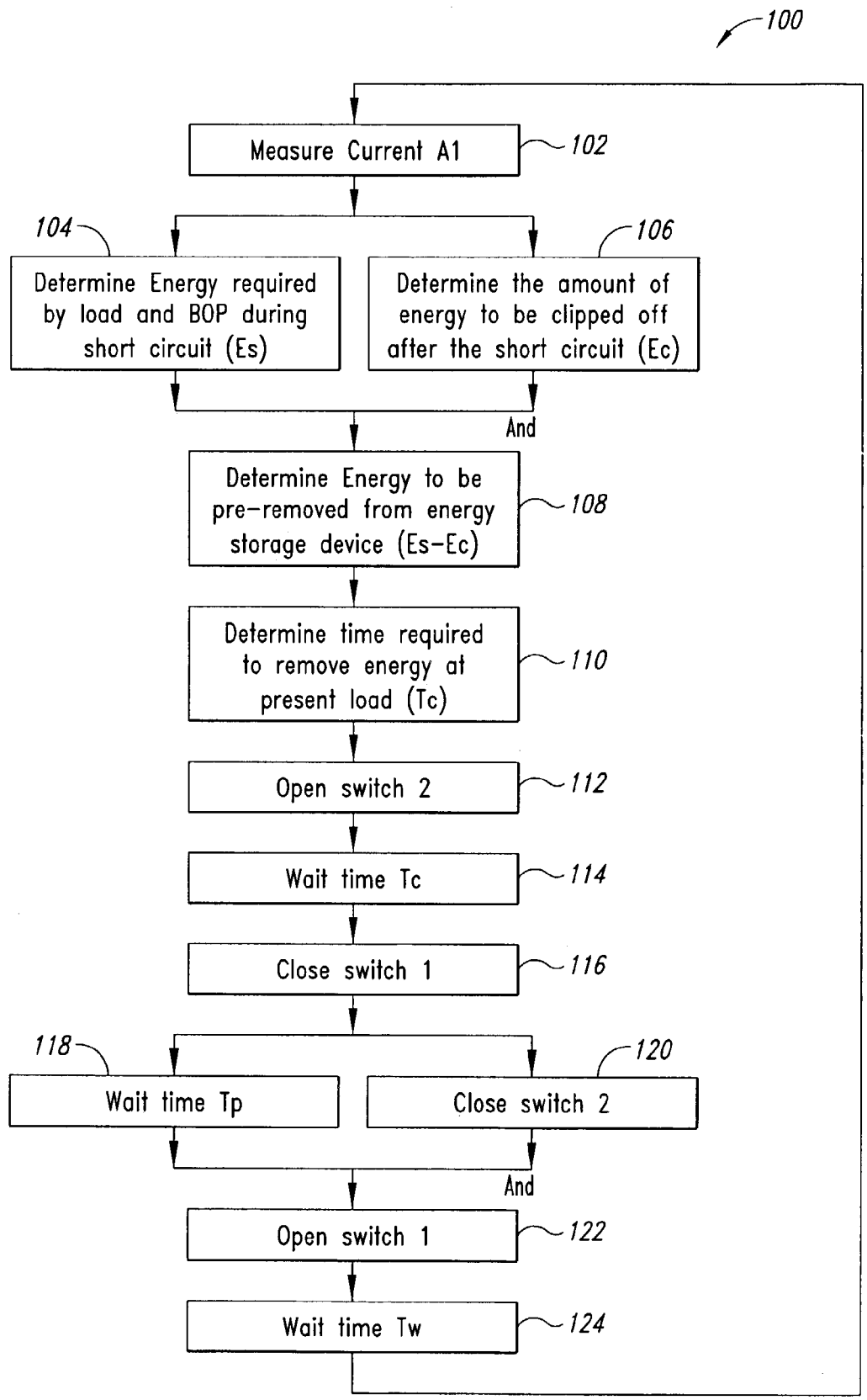
FIG. 15 is a flow diagram of a method of operating the power system of claim 14 according to one embodiment of the invention.

FIG. 15 is a flow chart for a control algorithm 100 for current pulsing the power system 10 of FIG. 14 according to one illustrated embodiment.

In step 102, the current sensor 58 measures the stack current. In step 104, the controller 18 determines the amount of energy which will be required to support the loads 12, 24 during the duration of the short circuit condition. In step 106, the controller 18 determines the amount of energy that will need to be clipped off after the short circuit condition ends in order to avoid exceeding the maximum stack voltage limit $V_z$. The steps 104 and 106 can occur in any order, and can even occur simultaneously.

In step 108, the controller 18 determines the energy to be pre-removed (i.e., prior to current pulse) from the energy storage device 26, which places the electrical storage device 26 in condition to sink the required amount of stack current in order to avoid exceeding the maximum stack voltage limit $V_z$, after current pulsing. In step 110, the controller 18 determines the period of time required to remove the energy given the present load.

In step 112, the controller 18 causes the fuel cell stack isolation switch S2 to open, isolating the loads 12, 24 from the fuel cell stack 14, and thereby causing the electrical storage device 26 to discharge to a suitable level by supplying the loads 12, 24 in place of the fuel cell stack 14. In step 114, the controller 18 waits the period determined in step 110. At the end of the determined period, the controller 18 closes the pulsing switch S1, current pulsing the fuel cell stack 14 by providing a short circuit path, or by placing a load 22 (FIG. 2), across the fuel cell stack 14.

In step 118, the controller 18 waits a pulse duration, for example, 500 milliseconds, after the closing of the pulsing switch S1. In step 120, the controller 18 causes the fuel cell stack isolation switch S2 to close, coupling the loads 12, 24 to the fuel cell stack 14. The steps 118 and 120 can occur in any order, and can even occur simultaneously. At the end of the pulse duration $T_P$, the controller 18 opens the pulsing switch S1, terminating the current pulse by removing the short circuit path or load 22 across the fuel cell stack 14. Various approaches to determining the time period $T_P$ were discussed above.

In step 124, the controller 18 waits a time period $T_W$, for example a time period sufficient for the stack voltage to drop to the point that another current pulse is required, before returning control to step 102. Various approaches to determining the time period $T_W$ were discussed above.

When executing the control algorithm 100, the controller 18 may compare the present stack voltage and current using a polarization look-up table to determine where the fuel cell stack 14 is operating on its polarization curve. Other means of determining where the fuel cell stack 14 is on its polarization curve may also be used.

Figure 16:
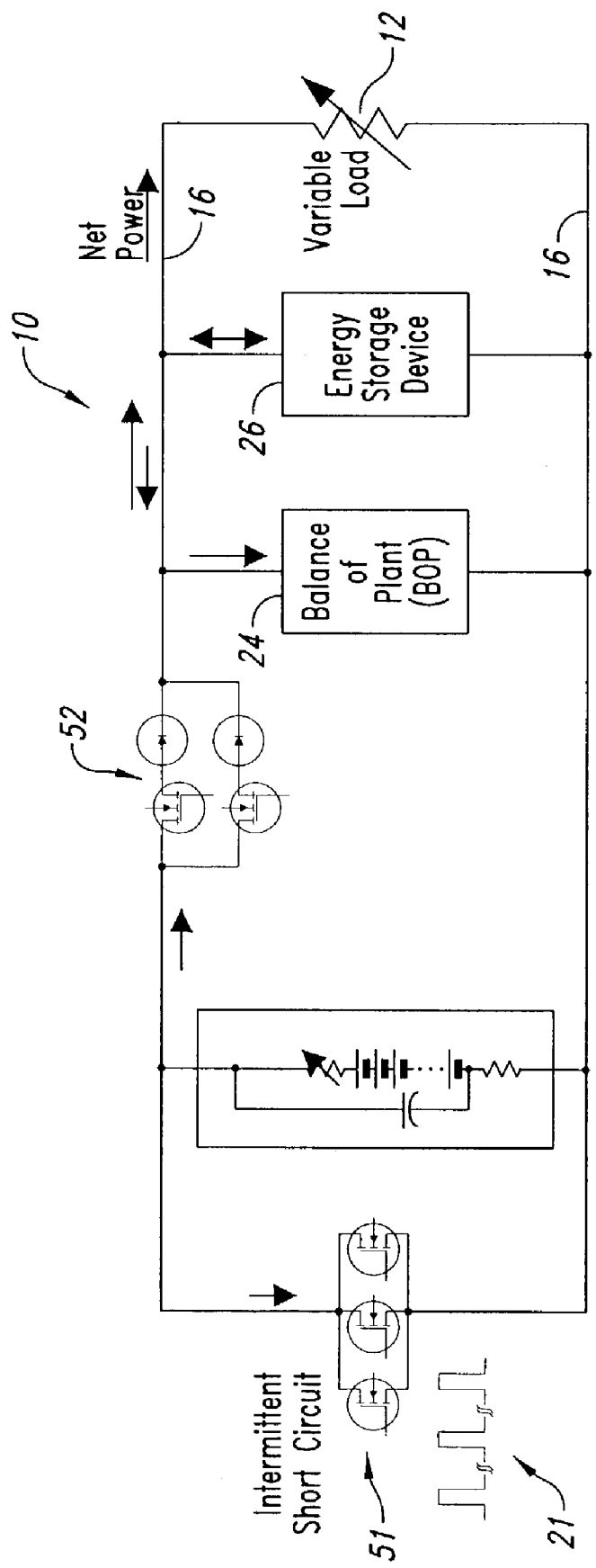
FIG. 16 is a schematic diagram of a power system according to another illustrated embodiment where the pulsing and isolation switches are each formed from multiple transistors such as MOSFETS.

FIG. 16 shows another embodiment of the power system 10, similar to that shown in FIG. 14, above. The embodiment of FIG. 16 includes a number of MOSFETS electrically coupled in parallel to form the pulsing switch S1 particularly suited to high current loads. The embodiment of FIG. 16 also shows a number of MOSFETS and associated diodes electrically coupled in parallel to form fuel stack isolation switch S2 particularly suited to high current loads.

EXAMPLE

A hybrid electric power system 10 comprising a NEXA™ fuel cell stack 14 and a 24 V VRLA battery bank 28 was operated with and without pulsing the stack current. The power system 10 in each case was supplied hydrogen and humidified air at 5 psig (35 kPa) and operated at a reactant inlet temperature of 65° C.

For the first run, the air was supplied to the fuel cell stack 14 at a stoichiometry of about 2.6. Operating without current pulsing, the power system maintained a voltage of 26.9 V at 34 A, which corresponds to about 915 W net output. The NEXA™ fuel cell stack 14 is rated for 1000 W net output, so this unit was underperforming.

The power system 10 was then configured as illustrated in FIG. 13. The shorting circuit (i.e., pulsing switch S1) consists of three MOSFETs in parallel. A 500 ms short is triggered by a manual pushbutton (not shown). The linear regulator FET, consisting of two IRFP2907 MOSFETs, limits the amount of current that can be drawn from the stack and maintains an output voltage to hold the batteries at a float voltage of 27.3 V. The Schottky diodes prevent shorting of the batteries. 500 ms shorting pulses were applied about once per minute during operation. The air stoichiometry was also increased to about 2.7, based on preliminary results that indicated a corresponding increase in stack voltage of about 1 V. The run time was 40 minutes. The power system 10 maintained a voltage of 27.3 V at 56.5 A, corresponding to about 1540 W net output. This represents a 68% increase in net power output, an additional 625 W.

Although specific embodiments of, and examples for, the power system and associated methods are described herein for illustrative purposes, various equivalent modifications can be made without departing from the spirit and scope of the invention, as will be recognized by those skilled in the relevant art. The teachings provided herein of the invention can be applied to other power systems, not necessarily the exemplary hybrid power system generally described above.

For example, the present method and apparatus may be employed in electric power systems 10 having fuel cell stacks 14 as the sole source of power. While such embodiments are less costly, it should be noted that the omission of the electrical storage device 24 will typically result in an interruption of current supply to the external load(s) 12 during current pulsing. Also for example, the power system may employ electrical storage devices.

The various embodiments described above can be combined to provide further embodiments. All of the above U.S. patents, U.S. patent application publications, U.S. patent applications, foreign patents, foreign patent applications and non-patent publications referred to in the this specification and/or listed in the Application Data Sheet, are incorporated herein by reference in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all power systems and methods that operate in accordance with the claims. Accordingly, the invention is not limited by the disclosure, but instead its scope is to be determined entirely by the following claims.

The invention claimed is:

1. A power system for providing power to at least one load, the power system comprising:
    a fuel cell stack comprising a plurality of serially coupled fuel cells and operable to output a fuel cell stack voltage corresponding to a sum of an output voltage of each of the plurality of serially coupled fuel cells;
    a means for shorting the fuel cell stack from time-to-time; and
    a means for clamping electrically coupled in parallel with the fuel cell stack, wherein the means for clamping limits a positive value of the fuel cell stack voltage such that the fuel cell stack voltage does not exceed a maximum stack voltage limit at least during a period immediately following the shorting of the fuel cell stack.

2. The power system of claim 1 wherein the means for clamping the fuel cell stack voltage comprises a zener diode electrically coupled in parallel with the fuel cell stack.

3. The power system of claim 1 wherein the means for clamping the fuel cell stack voltage comprises a shunt regulator electrically coupled in parallel with the fuel cell stack.

4. The power system of claim 1 wherein the means for clamping the fuel cell stack voltage comprises an electrical storage device electrically coupled in parallel with the fuel cell stack.

5. The power system of claim 1 wherein the means for clamping a fuel cell stack voltage comprises a controller executing control logic that operates a transistor electrically coupled in parallel with the fuel cell stack.

6. A power system, comprising:
a power bus;
a fuel cell stack comprising a plurality of serially coupled fuel cells, operable to output a fuel cell stack voltage corresponding to a sum of an output voltage of each of the plurality of serially coupled fuel cells, and electrically coupled in parallel with the power bus;
a pulsing switch electrically coupled in parallel with the fuel cell stack and operable to current pulse the fuel cell stack;
a controller coupled to selectively control the pulsing switch to current pulse the fuel cell stack from time-to-time; and
a means for clamping electrically coupled in parallel with the fuel cell stack, wherein the means for clamping limits a positive value of the fuel cell stack voltage such that the fuel cell stack voltage does not exceed a maximum stack voltage limit at least during a period following the current pulsing of the fuel cell stack.

7. The power system of claim 6 wherein the controller comprises:
an oscillator that operates the pulsing switch to periodically short the fuel cell stack.

8. The power system of claim 6 wherein the controller comprises:
an oscillator that operates the pulsing switch to periodically electrically couple a load across the fuel cell stack to current pulse the fuel cell stack.

9. The power system of claim 6 wherein the stack voltage clamping means comprises:
an electrical storage device electrically coupled in parallel with the fuel cell stack.

10. The power system of claim 6 wherein the stack voltage clamping means comprises:
an electrical storage device electrically coupled in parallel with the fuel cell stack, wherein the electrical storage device comprises at least one of a battery and a supercapacitor.

11. The power system of claim 6 wherein the stack voltage clamping means comprises:
a zener diode electrically coupled in parallel with the fuel cell stack to clamp a fuel cell stack voltage.

12. The power system of claim 6 wherein the stack voltage clamping means comprises:
a shunt regulator electrically coupled across the fuel cell stack to clamp a fuel cell stack voltage, the shunt regulator comprising a zener diode, a resistor, and a transistor having an input terminal, an output terminal and a control terminal, the zener diode electrically coupled between an output of the fuel cell stack and the control terminal of the transistor, and resistor electrically coupled in series between the zener diode and the control terminal of the transistor.

13. The power system of claim 6 wherein the controller comprises an oscillator that periodically causes the pulsing switch to electrically short the fuel cell stack and wherein the stack voltage clamping means comprises:
a voltage sensor coupled to provide a signal representing a voltage sensed on the power bus; and
shunt regulator logic implemented in the controller that causes the pulsing switch to electrically short the fuel cell stack in response to a fuel cell stack voltage exceeding a threshold voltage.

14. The power system of claim 6 wherein the stack voltage clamping means comprises:
an electrical storage device;
a zener diode electrically coupled across the power bus in parallel with the fuel cell stack;
an fuel cell stack isolation switch electrically coupled in series between the fuel cell stack and the electrical storage device, wherein the controller is further coupled to control the fuel cell stack isolation switch;
a current sensor positioned to sense an output current from the fuel cell stack and provide a resulting value representing the sensed current to the controller; and
a diode electrically coupled between the fuel cell stack and the electrical storage device to protect the electrical storage device from shorting.

15. The power system of claim 6 wherein the stack voltage clamping means comprises:
an electrical storage device;
a first metal oxide semiconductor field effect transistor and a first Schottky diode electrically coupled in series to one another; and
at least a second metal oxide semiconductor field effect transistor and a second Schottky diode electrically coupled in series to one another and electrically coupled in parallel to the first metal oxide semiconductor field effect transistor and the first Schottky diode, the first and the second metal oxide semiconductor field effect transistors and the first and the second Schottky diodes electrically coupled between the fuel cell stack and the electrical storage device.

* * * * *

UNITED STATES PATENT AND TRADEMARK OFFICE
CERTIFICATE OF CORRECTION

PATENT NO. : 7,632,583 B2 Page 1 of 1
APPLICATION NO. : 10/430903
DATED : December 15, 2009
INVENTOR(S) : Martin T. Pearson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1375 days.

Signed and Sealed this

Second Day of November, 2010

David J. Kappos
*Director of the United States Patent and Trademark Office*